United States Patent [19]

Ono et al.

[11] 4,179,281

[45] Dec. 18, 1979

[54] METHOD FOR COOLING HIGH-TEMPERATURE REDUCED IRON

[75] Inventors: Katsuya Ono, Kitakyushu; Takashi Nakamura; Toru Wakabayashi, both of Himeji, all of Japan

[73] Assignee: Nippon Steel Corporation, Tokyo, Japan

[21] Appl. No.: 907,850

[22] Filed: May 19, 1978

[30] Foreign Application Priority Data

Sep. 7, 1977 [JP] Japan ................................ 52-107612
Mar. 23, 1978 [JP] Japan ................................ 53-33322

[51] Int. Cl.$^2$ ............................ C23F 7/04; C23F 9/02
[52] U.S. Cl. ..................................... 75/35; 75/0.5 BA
[58] Field of Search ............. 75/34, 35, 0.5 BA, 0.5 B

[56] References Cited

U.S. PATENT DOCUMENTS 4,070,180 1/1978 Waslo .................................... 75/34

Primary Examiner—M. J. Andrews
Attorney, Agent, or Firm—Wenderoth, Lind & Ponack

[57] ABSTRACT

A method for cooling high temperature reduced iron produced by a direct reduction process in a cooling zone integrated with a direct reduction furnace, such as a shaft furnace, which method utilizes the exhaust gas of the reducing furnace as the cooling gas with great operational and economical advantages.

5 Claims, 5 Drawing Figures

METHOD FOR COOLING HIGH-TEMPERATURE REDUCED IRON

BACKGROUND OF THE INVENTION

1. Field of the Invention

The present invention relates to a method for cooling high temperature reduced iron produced by a direct reduction process in a cooling zone integrated with a direct reduction furnace, such as a shaft furnace, which method utilizes the exhaust gas of the reducing furnace as the cooling gas with great operational and economical advantages.

In recent years, so-called direct iron-making processes, which reduce iron ores with gases or carbonaceous materials, have been used more and more in commercial practice.

These direct processes have certain advantages over the blast furnace process, which is presently the main source for iron and steel making, in that energy to be used can be more freely selected, less capital cost is required for the apparatus, thus they are more suitable for a small scale of production, and a high degree of technics as required by the blast furnace process is not required. Due to these advantages, the general tendency is that the direct iron-making processes will produce an increasing amount of iron on a commercial scale.

For reduction of iron ores in the direct iron-making processes, the iron ores are heated at a temperature not lower than 700° C. with solid carbonaceous materials, such as coal and coke; or reducing gases, such as natural gas, petroleum fuel and modified coke-oven gas; or coal gas. In order to remove the gangue component and refine the reduced iron in a melting furnace, the reduced iron is transported to the melting furnace. If the melting furnace is close to the reducing furnace, it is possible to transport and discharge the hot reduced iron to the melting furnace as "hot charge."

In most cases, however, the hot reduced iron is once cooled and then transported to the melting furnace. The cooling has been done by briquetting the hot reduced iron and leaving the briquetts in the air, or by means of a reducing gas or a neutral gas.

In recent years, a high-pressure direct reducing furnace with an increased furnace gas pressure has been in commercial use for improving the production efficiency of a direct reducing furnace. In this type of a direct reduction furnace, the increased furnace gas pressure increases the reduction rate of the iron ores, and makes it possible to increase the amount of reducing gas for improved productivity without increasing the gas flow velocity through the furnace, hence being free from various troubles, such as hangings and fluidization. For adjustment of the furnace gas pressure in a high-pressure direct reduction furnace, usually a gas pressure adjusting device is provided at the gas exhaust portion, so as to maintain a furnace gas pressure normally in the range from 1.5 to 5 kg/cm². The desired effect of the high pressure operation can be expected when the furnace gas pressure is 1.5 kg/cm² or higher, and for a commercial operation it is preferable to maintain the furnace gas pressure at 2 kg/cm² or higher. On the other hand, with a furnace gas pressure higher than 5 kg/cm², the reduction rate is not substantially improved and it becomes difficult to control the gas pressure.

For cooling the high-temperature reduced iron produced in a high-pressure direct reducing furnace, it is necessary to cool it in a cooling zone communicating with the reducing furnace under a high-pressure condition, because the temperature within the furnace is at lowest 700° C. or higher and it is difficult to seal the pressure under the high temperature condition, and thus it is impossible to take out the reduced iron from the furnace at the high temperature by reducing the furnace gas pressure to the atmospheric pressure.

In the case where the reduced iron is cooled in the cooling zone integrated with the high-pressure direct reducing furnace, when a reducing gas containing CO is used as the cooling gas, carbon precipitation is caused in the reduced iron layer in the furnace, resulting in various troubles, such as hangings, and ultimately prohibiting the operation of the furnace as a whole. This carbon precipitation is more remarkable as the furnace pressure increases.

More particularly, this carbon precipitation is caused by the following reaction, and when metallic iron is present in the reaction system, it acts as a catalyst to promote the carbon precipitation and the reaction is more promoted at a higher pressure.

$$2CO \rightarrow CO_2 + C$$

The above reaction is remarkable at a relatively low temperature between 400° and 600° C., and when the reduced iron is cooled from a temperature of 700° C. or higher, the cooling passes through the above temperature range, so that some carbon precipitation is unavoidable.

In a high-pressure direct reduction furnace, the cooling is done under an elevated pressure and the above reaction is sharply promoted, so that it is impossible to cool the reduced iron with the reducing gas composition used as a cooling gas in a normal-pressure reducing furnace.

Also when the reduced iron is cooled in a high-pressure direct reduction furnace, methane formation is caused by the following reactions between CO and H₂ in the cooling gas.

$$CO + 3H_2 \rightarrow CH_4 + H_2O$$

$$2CO + 2H_2 \rightarrow CH_4 + CO_2$$

Both of the above reactions are exothermic, so that when the above methane forming reaction is caused, the cooling efficiency is markedly lowered. These reactions, just as the carbon precipitation reaction, are also promoted as the furnace pressure is increased.

Now when the reduced iron is treated in a subsequent step, such as in an electric furnace, there is one considerable problem to be solved. The reduced iron is reoxidized during its storage in the air after cooling or during its transportation. The reduced iron usually has a high porosity (30 to 70%) and is easily permeated by the air, and its reoxidation is promoted by the presence of water. The reduced iron, when reoxidized, is not only degraded in its commercial value due to the lowered metal value, but also is very dangerous because it burns due to the exothermic reaction of rapid reoxidation and it may cause fires.

SUMMARY OF THE INVENTION

Therefore, one of the objects of the present invention is to provide a method for cooling hot reduced iron in a cooling zone integrated with a direct reduction furnace, which method can avoid or reduce the carbon precipitation and the methane formation which cause various operational difficulties and are inherent to the cooling in the cooling zone of the direct reduction furnace operated under the high-temperature and high-pressure conditions, and which method at the same time can passivate the reduced iron by formation of a thin oxide film thereon during the cooling.

According to another aspect of the present invention, a part or almost all of the exhaust gas from the direct reduction furnace is reformed and utilized as the cooling gas so that a great operational advantage can be obtained.

Thus, the present invention is characterized in that a hydrogen-containing gas reformed to have a gas composition as defined below is used for cooling the high-temperature reduced iron.

Gas composition
$CO_2$: 5–20%, preferably 10–18% by volume
$CO_2$: not higher than $26.7 X^{-0.234}$ wherein X is the pressure of the cooling gas ($kg/cm^2$)
Balance: mainly reducing gas or neutral gas

DETAILED DESCRIPTION OF THE INVENTION

The present invention will be described in more detail referring to the attached drawings.

Figure 1:
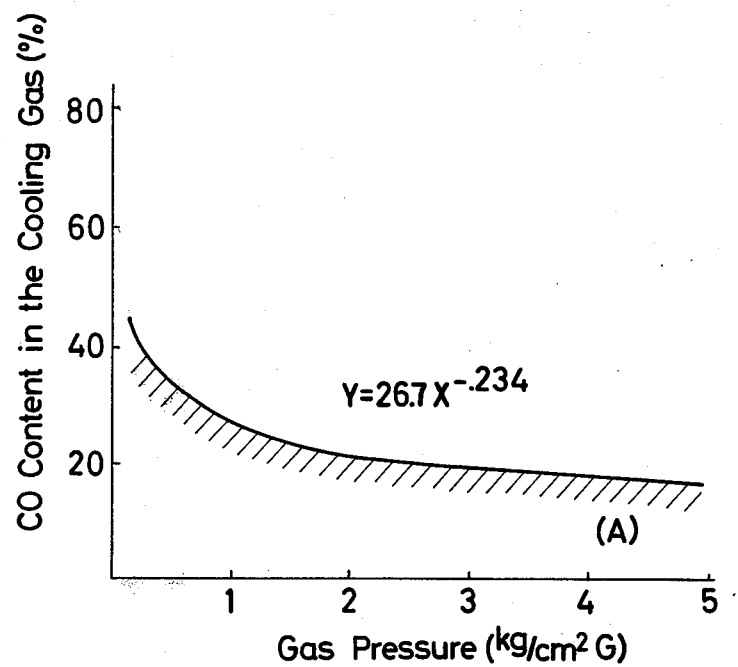
FIG. 1 shows the relation between the CO content in the cooling gas and the pressure of the cooling gas for obtaining a carbon precipitation amounting to 1.5% by weight in respect to the reduced iron.

The present inventors have conducted a series of experiments using various high-pressure reducing gases containing CO to determine the relation between the gas pressure and the CO content in the cooling gas which results in a carbon precipitation amounting to 1.5% by weight in respect to the reduced iron, and the results of the experiments are shown in FIG. 1.

It has been found from the results that when the reduced iron is cooled with a high-pressure reducing gas containing CO, the operational trouble due to the hangings during the cooling, the lowering of cooling efficiency due to the exothermic reaction of carbon precipitation, the loss of reducing gas due to the conversion of CO gas to $CO_2$, or difficulties in the subsequent melting step of the reduced iron due to the increased carbon content can be avoided when the carbon precipitation is maintained not more than about 1.5% by weight in respect to the reduced iron. Also it has been found that the carbon precipitation markedly increases when $H_2$ is present in the cooling gas. The effect of the $H_2$ content in the cooling gas on the amount of carbon precipitation is particularly remarkable when the $H_2$ content is 1% or more and the effect does not substantially change any more even when the $H_2$ content increases more than 1%. However, the exhaust gas from a direct reducing furnace to be utilized in the present invention contains in almost all cases 1% or more hydrogen gas. Therefore, in the present invention, the changes in the carbon precipitation due to the hydrogen content may be neglected. Thus, FIG. 1 shows the CO contents in the cooling gas in correlation with the gas pressures, which produce a carbon precipitation amounting to 1.5% by weight in respect to the reduced iron when the hydrogen content is 1% or higher. Therefore, the graph shown in FIG. 1 has been formulated by plotting the results of a series of experiments.

From the graph, it follows that when $H_2 \geq 1\%$ CO%(Y) in the gas $\leq 26.7 X^{-0.234}$.

Therefore, in FIG. 1, a gas containing 1% or more by volume of hydrogen can be used as the cooling gas in the present invention if the CO content is maintained in the range (A) in correlation with the gas pressures.

It has been also found that the methane formation in the range (A) is very slight and the methane content in the cooling gas within this range is only 0.5% or less and the lowering of the cooling efficiency due to the exothermic reaction of methane formation is negligible.

Within the range (A), a pressure not less than 2 $kg/cm^2$ is desirable for commercial operation of the direct reduction furnace, and in this case, not more than 16% by volume of CO content is desirable for stabilized cooling in view of variations in the cooling gas composition.

Another important aspect of the present invention is that the reduced iron is made resistant to reoxidation during its cooling step. As methods for preventing the reoxidation of reduced iron, the briquette method and the passivation method are conventionally known. According to the briquette method, the hot reduced iron is, directly or after cooled to room temperature, formed into briquettes with less porosity. The process is effective and reliable for prevention of reoxidation of the reduced iron, but it has defects in that the briquetting equipment is costly and running costs, such as for replacement of upper molds and power consumption, are high, thus resulting in increased production cost of reduced iron. Also, as mentioned hereinbefore, it is difficult to reduce the furnace gas pressure in a high-pressure direct reduction furnace at high temperatures and hence the hot briquetting method is not suitable.

Meanwhile, according to a conventional passivation method, the reduced iron discharged from the reduction furnace is transferred to a separate passivation equipment where a thin oxide film is formed on the surface of the reduced iron under an oxidizing atmosphere. This method, however, requires the passivation equipment, and adjustment of the oxidizing gas composition and control of the temperature require complicated operations.

According to the present invention, the reduced iron has already been passivated against reoxidation while it is cooled, and thus the cooled reduced iron can be transported to a melting shop without requirement of any special equipment.

The reoxidation prevention treatment during the cooling according to the present invention is effected by the $CO_2$ content in the cooling gas. $CO_2$ is a weak oxidizing gas, and when contained in an appropriate amount in the cooling gas, will oxidize a very thin surficial portion of the reduced iron, thus passivating the reduced iron.

According to the present invention, it is appropriate to maintain 5–20% by volume of $CO_2$ in the cooling gas.

Figure 2:
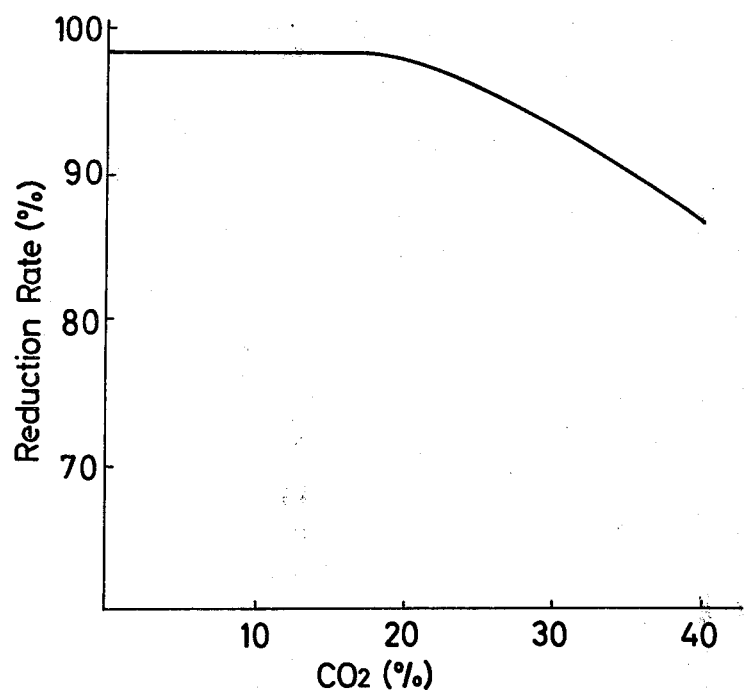
FIG. 2 shows the relation between the $CO_2$ content in the cooling gas and the reduction rate of the reduced iron after discharging.
Figure 3:
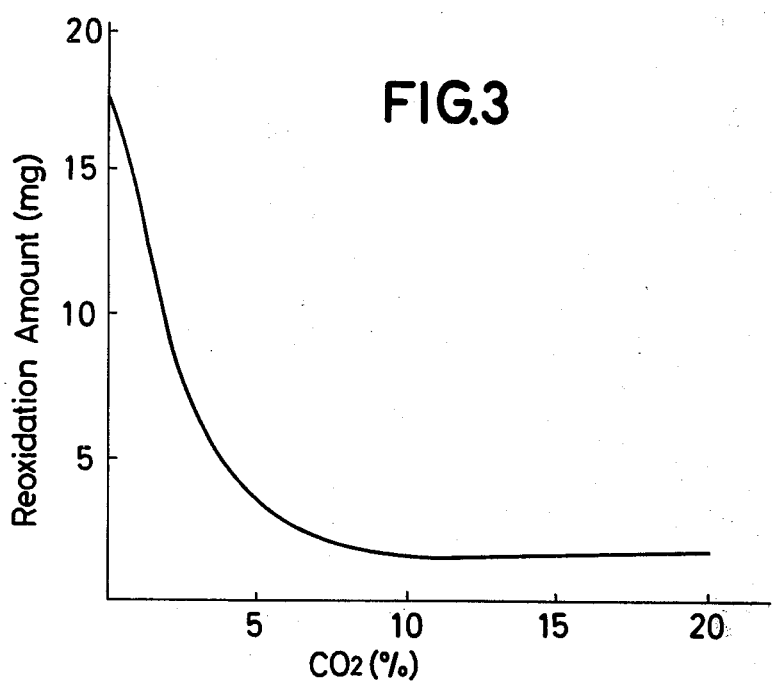
FIG. 3 shows the relation between the $CO_2$ content in the cooling gas and the reoxidation of the reduced iron in the pellet form 10 hours after the cooling.

Reasons for defining the above range of the $CO_2$ content in the cooling gas are clearly understood from the relations between the $CO_2$ contents and the reduction rate and the reoxidation of the reduced iron as shown in FIGS. 2 and 3. Thus, investigations on the relation between the $CO_2$ proportions in gases mainly composed of $N_2$ and the reduction rate of the hot reduced iron pellets (see FIG. 2) reveal that the reduction rate begins to lower when the $CO_2$ content increases to 20% or higher. Meanwhile, it is understood from FIG. 3, showing the relation between the reoxidation amount of the reduced iron pellets when left for 10 hours in the air after discharge from the cooling zone, and the $CO_2$ contents in the cooling gas, that the reoxidation is remarkable with $CO_2$ contents less than 5%.

Therefore, $CO_2$ contents less than 5% in the cooling gas are not enough for formation of an effective oxide film on the reduced iron, and if the reduced iron is stored for a long period of time in the air, reoxidation of the reduced iron is caused.

On the other hand, with $CO_2$ contents beyond 20%, the reduced iron is oxidized during cooling, thus lowering the metallization and degrading the commercial value of the reduced iron.

In the present invention, the cooling gas having the above defined composition is prepared by using a part or almost all of the exhaust gas from the direct reduction furnace itself. In general, the reducing gas introduced to the direct reduction furnace is composed mainly of CO, $H_2$ and $N_2$, and these components reduce iron ores in the furnace. After the reduction, the gas is exhausted outside the furnace as a gas containing CO, $H_2$, $N_2$ and further $CO_2$ and $H_2O$. The composition of the exhaust gas varies depending on the reduction gas composition as well as the reduction efficiency in the reducing furnace, and thus does not fall within the cooling gas composition defined in the present invention. Therefore, the exhaust gas as exhausted from the reduction furnace cannot be used as the cooling gas.

In the present invention as mentioned just before, a part of the exhaust gas from the reduction furnace is treated and used as the cooling gas, and in this case it is necessary to remove excessive $CO_2$ content beyond 20% from the exhaust gas, because the cooling gas used in the present invention must be adjusted so as to contain 5 to 20% by volume of $CO_2$. This removal may advantageously be done by partially removing the $CO_2$ content through a regeneration process. As the $CO_2$ removing process, a chemical absorption process by means of aqueous solutions, such as of amines and potassium carbonate, and a physical absorption process by means of N-methylpyrrolidone, methanol, etc., are known. In the present invention, the exhaust gas may be adjusted to have a predetermined $CO_2$ content as required by the cooling gas by these known $CO_2$-removing processes, or a part of the exhaust gas may be removed of $CO_2$ completely by these known processes and mixed with the remainder of the exhaust gas to obtain a predetermined gas composition.

When the exhaust gas contains a large amount of CO, it is sometimes impossible to obtain a predetermined CO content only by the $CO_2$ removal. In such a case, a neutral gas or a non-oxidizing gas containing no CO may be introduced to the exhaust gas to lower the CO concentration to obtain a predetermined gas composition, or the exhaust gas may be modified by the following reaction under the presence of water vapour.

$$CO + H_2O = CO_2 + H_2$$

The above reaction is usually performed with a catalyst at a temperature between 370° and 450° C., and $H_2O$ is condensed by cooling and CO is replaced by $H_2$. Naturally, as replacement of CO by $H_2$ is to adjust the CO content of the exhaust gas in accordance with the required cooling gas composition, it is not necessary to completely replace CO by $H_2$ as required in a hydrogen production process, and thus the control is very simple. In the present invention, it is desirable in view of the sequence of steps that the replacement of CO is done prior to the removal of $CO_2$.

In order to obtain more effective cooling of the hot reduced iron, it is desirable to use the cooling gas having a controlled composition at temperatures as low as possible. The cooling gas may flow in a counter-current to or co-current with the hot reduced iron depending on the structure of the cooling zone in the reducing furnace. When the cooling gas is used wholly or partially in circulation, it is necessary to cool the cooling gas which has been used for the cooling and heated thereby.

The cooling of the heated cooling gas may be done by means of a refrigerator or other means, but if the cooling is done by utilizing the reaction heat, care must be taken so as to avoid deviation of the gas composition from a predetermined range.

The temperature of the cooling gas should be lower than the temperature to which the reduced iron is cooled, i.e., not higher than 100° C., and usually it is satisfactory if the cooling gas is between the ordinary temperature and 50° C.

The cooling gas used in the present invention slightly changes in its composition when it is heated during the cooling of the reduced iron, or when some carbon precipitation which does not cause operational troubles takes place. When such a cooling gas with changed composition, or a part thereof, is used in circulation, it is necessary to adjust the composition of additional gas to be mixed so as to assure a predetermined composition of the cooling gas at the inlet of a cooling equipment or at the inlet of a cooling zone of the reduction furnace. Regarding the cooling rate of the reduced iron in the present invention, it is desirable to cool the reduced iron with a cooling rate as high as possible. In the case of cooling the reduced iron from temperatures of 700° C. or higher, it is desirable to supply the cooling gas so as to assure a cooling rate not less than 3° C.min.

Regarding the components other than $CO_2$ and CO in the cooling gas according to the present invention, a neutral or non-oxidizing gas is desirable, and regarding the water vapour, water vapour not more than its saturation value at the ordinary temperature (20°-30° C.) is allowable in the present invention.

DESCRIPTION OF THE PREFERRED EMBODIMENT

Figure 4:
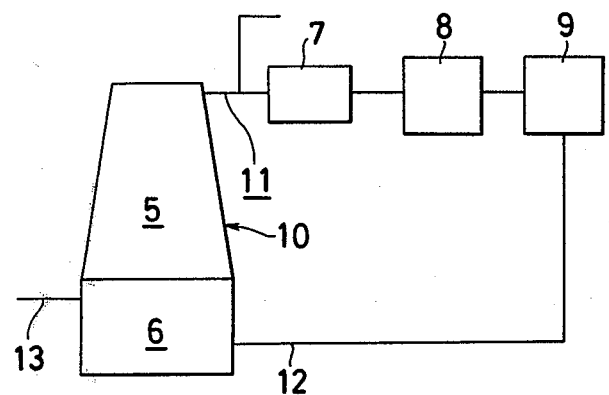
FIG. 4 shows a schematic flow-sheet of the production of reduced iron embodying the present invention.

The present invention will be better understood from the following description of a preferred embodiment by reference to FIG. 4.

The exhaust gas from a shaft reduction furnace 10, in which iron ore pellets are reduced in a reducing zone 5 with a reducing gas under gas pressures of 2 kg/cm² and 3 kg/cm² is exhausted from the top of the furnace through a duct 11 to a dust remover 7 for dust removal, and introduced into a CO converter 8, then mixed with exhaust gas from a reducing gas modifier and passed to a $CO_2$ removing equipment 9 to prepare a cooling gas of a predetermined composition. The compositions of the exhaust gas and the cooling gas are shown in Table 1, and treating conditions in the CO converter and the CO₂ removing equipment are shown in Table 2.

Table 1

| Component Gases | Compositions of Exhaust Gas and Cooling Gas | | | | |
|---|---|---|---|---|---|
| | CO | $CO_2$ | $H_2$ | $N_2$ | $CH_4$ |
| Exhaust Gas | 35.3 | 23.0 | 39.9 | 1.4 | 0.4 |
| Cooling Gas 1 (2 kg/cm²) | 15.8 | 15.2 | 61.1 | 1.5 | 0.4 |
| Cooling Gas 2 (3 kg/cm²) | 14.6 | 16.5 | 66.9 | 1.5 | 0.4 |
| Cooling Gas 3 (3 kg/cm²) | 12.8 | 15.7 | 14.5 | 56.9 | 0.1 |

Table 2

| Treating Conditions in CO converter and CO₂ Removing Equipment | |
|---|---|
| Equipment | Treating Condition |
| CO Converter | Temperature : 400° C. |
| | Catalyst : Oxides of Fe and Cr |
| CO₂ Removing Equipment | Amine Method |
| | Absorbent : MEA |

Meanwhile, the iron pellets reduced in the reducing zone 5 are successively discharged into the cooling zone 6 and after cooling they are stored in a stock yard, etc. In the above embodiment, a cooling gas which is free from the carbon precipitation problem and at the same time is capable of preventing the reoxidation of the reduced iron can be prepared from the exhaust gas with a simple operation.

Then, the cooling gas is supplied to the cooling zone 6 through a cooling gas pipe 12 to cool the reduced iron pellets from 900° C. down to 100° C., and the cooling gas used for the cooling is exhausted through an exhaust pipe 13. The carbon precipitation in the reduced iron pellets is only 0.3% by weight or less, and there is no operational trouble during the travel of the reduced iron pellets through the cooling zone.

Also there is caused almost no heat generation due to the carbon precipitation reaction and the methane formation reaction, and the cooling is efficiently performed.

Figure 5:
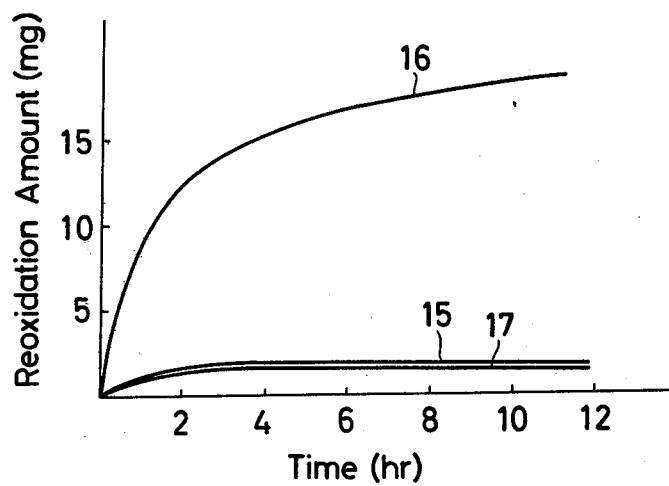
FIG. 5 shows the reoxidation characteristics of the reduced iron produced according to the present invention.

Then the reduced iron pellets thus obtained were subjected to reoxidation tests. The curves 15 and 17 in FIG. 5 represent the reoxidation of the reduced iron pellets cooled with the cooling gas composition according to the present invention, while the curve 16 represents the reoxidation of similar reduced iron pellets cooled in a neutral atmosphere. As clearly shown by the graph, the reduced iron pellets cooled according to the present invention are better than the pellets cooled in a neutral atmosphere.

As described above, the present invention is very advantageous in that the cooling of the reduced iron can be performed with a cooling gas prepared by modifying the exhaust gas without operational difficulties due to carbon precipitation and at the same time, the passivation treatment of the reduced iron can be performed.

What is claimed is:

1. A method for cooling high-temperature reduced iron in a cooling zone, integrated with a direct reducing furnace, under a high pressure condition, which comprises contacting said high-temperature reduced iron, having a temperature of 700° C. or higher, with a hydrogen-containing cooling gas in said cooling zone, the pressure in said cooling zone being 1.5 to 5 kg/cm² G, said hydrogen-containing cooling gas containing 5-20% by volume of $CO_2$ and also containing CO in an amount satisfying the condition that $CO(\%) \leq 26.7 X^{-0.234}$, wherein X is the pressure in said cooling zone.

2. A method according to claim 1, in which the cooling gas consists of hydrogen, $CO_2$, CO and one or more non-oxidizing gases.

3. A method according to claim 1, in which the pressure in the cooling zone is 2 to 5 kg/cm² G.

4. A method according to claim 1, in which the cooling gas contains not less than 1% of hydrogen.

5. A method according to claim 1, in which the cooling gas is prepared from an exhaust gas from the direct reducing frame.

* * * * *